(12) United States Patent
Aoyagi et al.

(10) Patent No.: US 11,942,876 B2
(45) Date of Patent: Mar. 26, 2024

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventors: Kazuki Aoyagi, Tokyo (JP); Yoshihiro Tawada, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 199 days.

(21) Appl. No.: 17/754,550

(22) PCT Filed: Dec. 20, 2019

(86) PCT No.: PCT/JP2019/050201
§ 371 (c)(1),
(2) Date: Apr. 5, 2022

(87) PCT Pub. No.: WO2021/124577
PCT Pub. Date: Jun. 24, 2021

(65) Prior Publication Data
US 2023/0261587 A1   Aug. 17, 2023

(51) Int. Cl.
*H02M 7/539*    (2006.01)
*H02M 1/00*     (2006.01)
*H02M 7/48*     (2007.01)

(52) U.S. Cl.
CPC ......... *H02M 7/539* (2013.01); *H02M 1/0025* (2021.05); *H02M 7/48* (2013.01)

(58) Field of Classification Search
CPC ...... H02M 1/0025; H02M 1/32; H02M 7/539; H02M 7/5395
See application file for complete search history.

(56) References Cited

U.S. PATENT DOCUMENTS

| | | | |
|---|---|---|---|
| 2013/0027993 A1* | 1/2013 | Tan | H02J 3/24 363/40 |
| 2013/0279213 A1* | 10/2013 | Saeki | H02M 5/4585 363/125 |
| 2022/0158568 A1* | 5/2022 | Uda | H02M 1/0025 |

FOREIGN PATENT DOCUMENTS

| | | |
|---|---|---|
| CN | 104115389 A | 10/2014 |
| JP | 4775181 B2 | 9/2011 |

(Continued)

OTHER PUBLICATIONS

Indian Office Action dated Aug. 4, 2022 in Indian Patent Application No. 202217020001, 6 pages.

*Primary Examiner* — Fred E Finch, III
(74) *Attorney, Agent, or Firm* — Oblon, McClelland, Maier & Neustadt, L.L.P.

(57) ABSTRACT

A power conversion device includes: a power conversion circuit connected to a direct-current power supply and a power system and configured to perform conversion between direct-current power and alternating-current power; a phase-locked loop circuit configured to output a phase instruction value based on a system alternating-current voltage phase of the power system; and a control circuit configured to control the power conversion circuit based on the phase instruction value from the phase-locked loop circuit. The phase-locked loop circuit includes: a phase difference calculation section configured to calculate a phase difference in a predetermined cycle, the phase difference representing a deviation of the phase instruction value from the system alternating-current voltage phase of the power system; a phase difference correction section; and a phase instruction value generation section configured to output the phase instruction value based on an output of the phase difference correction section.

2 Claims, 2 Drawing Sheets

(56) References Cited

FOREIGN PATENT DOCUMENTS

JP           6392708 B2    9/2018
WO    WO 2013/175569 A1   11/2013

\* cited by examiner

POWER CONVERSION DEVICE

FIELD

This application relates to a power conversion device connected to a power system.

BACKGROUND

Conventionally, as described in, for example, JP Patent No. 6392708, power conversion devices each including a PLL circuit (phase-locked loop circuit) have been known. According to paragraph 0033 of the literature, a phase difference $\Delta\theta$ between an input signal and an output signal of the PLL circuit is calculated. The phase difference $\Delta\theta$ is added to a voltage phase detected by the PLL circuit as a feedforward control amount. Consequently, a current feedback control system is stabilized.

CITATION LIST

Patent Literature

[PTL 1] JP Patent No. 6392708

SUMMARY

Technical Problem

A power conversion circuit is capable of performing AC/DC conversion for converting alternating-current power into direct-current power and DC/AC conversion for the opposite. AC/DC conversion is also used as a charging operation mode in which direct-current power for charging is produced from system alternating-current power.

Occurrence of a system disturbance during system-connected operation may cause an abrupt change of a system voltage phase. If control fails to follow the system disturbance may cause unintended occurrence of the aforementioned AC/DC conversion. As a result, there arise problems, for example, overvoltage occurring because of unintended charging of a direct-current capacitor provided on the direct current side of the power conversion circuit.

In the technique of JP Patent No. 6392708, feedforward correction can be performed not only where a phase difference is relatively large but also where the phase difference is small, and an amount of the correction is determined based on the phase difference $\Delta\theta$ between the input signal and the output signal of the PLL circuit. However, an abrupt phase change caused by a system disturbance can be a change that is too abrupt to follow with the existing PLL circuit alone. This point has not sufficiently been considered in conventional techniques and there has still been room for improvement.

The present application has been filed in order to solve the aforementioned problem and an object of the present application is to provide a power conversion device with enhanced capability of following a system voltage phase.

Solution to Problem

A power conversion device according to the present application includes: a power conversion circuit connected to a direct-current power supply and a power system and configured to perform conversion between direct-current power and alternating-current power; a phase-locked loop circuit configured to output a phase instruction value based on a system alternating-current voltage phase of the power system; and a control circuit configured to control the power conversion circuit based on the phase instruction value from the phase-locked loop circuit.

The phase-locked loop circuit includes: a phase difference calculation section configured to calculate a phase difference in a predetermined cycle, the phase difference representing a deviation of the phase instruction value from the system alternating-current voltage phase of the power system; a phase difference correction section; and a phase instruction value generation section configured to output the phase instruction value based on an output of the phase difference correction section. The phase difference correction section is configured to, if a difference between a current phase difference currently calculated by the phase difference calculation section and a previous phase difference previously calculated by the phase difference calculation section exceeds a predetermined reference, add a first correction amount to the current phase difference to output the corrected current phase difference, and if the difference does not exceed the reference value, output the uncorrected current phase difference without adding the first correction amount to the current phase difference.

Advantageous Effects of Invention

The power conversion device according to the present application enables adding an appropriate correction amount to a current phase difference only if there is a relatively abrupt change in the phase difference. On the other hand, if change in the phase difference is not so large, no correction amount is added, and thus, a proper correction amount can freely be set from the perspective of use at the time of an abrupt change of a system voltage phase. Consequently, even when a system disturbance occurs, high capability of following the system voltage phase can be exerted.

DESCRIPTION OF EMBODIMENTS

Figure 1:
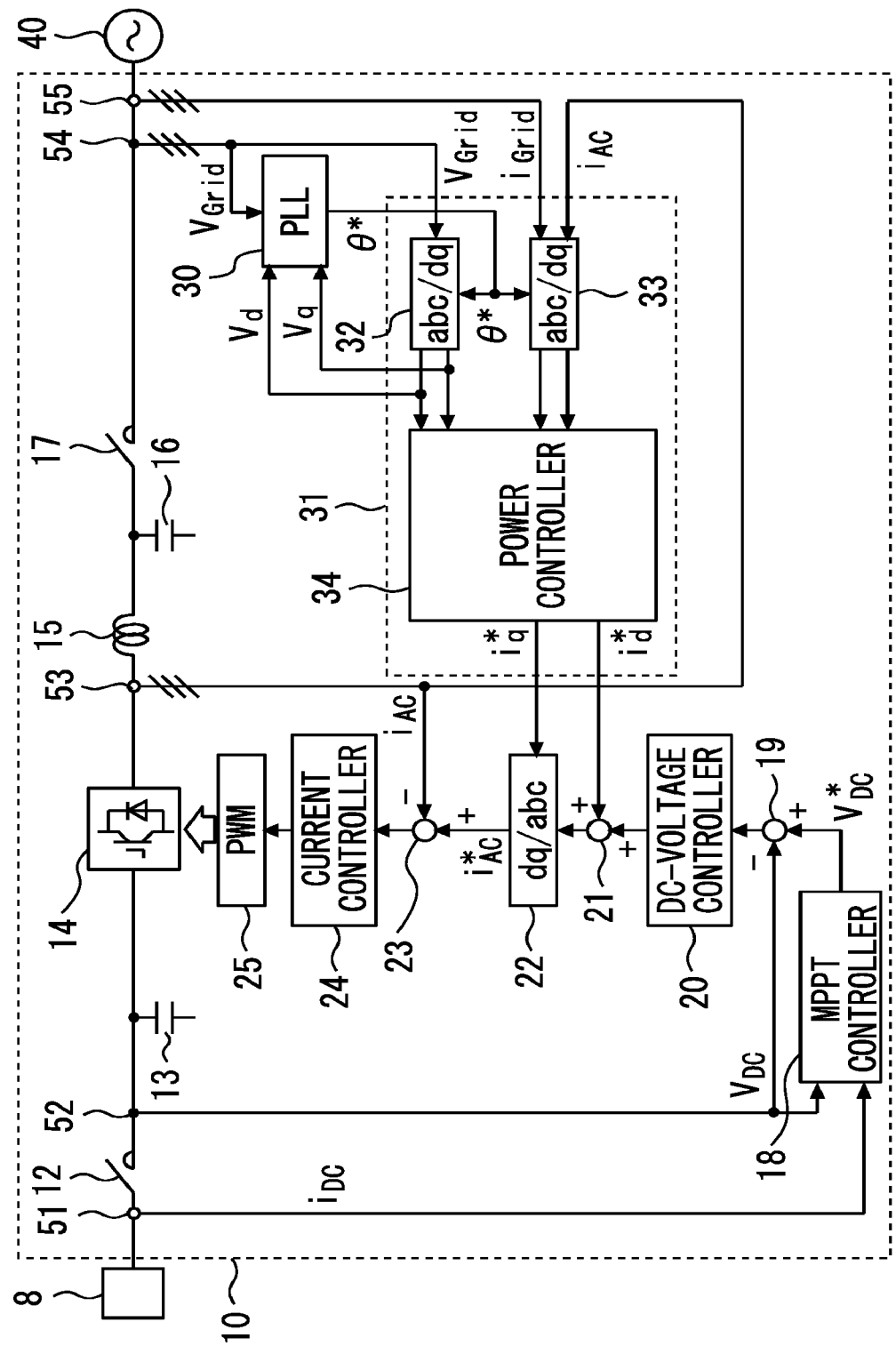
FIG. 1 is a configuration diagram of a power conversion device according to an embodiment.

FIG. 1 is a configuration diagram of a power conversion device 10 according to an embodiment. As illustrated in FIG. 1, the power conversion device 10 is provided so as to be interposed between a direct-current power supply device 8 and a power grid 40.

The power conversion device 10 includes a direct current-side relay 12, a direct-current capacitor 13, a power conversion circuit 14, an alternating-current reactor 15, an alternating-current capacitor 16 and an alternating current-side relay 17. The power conversion device 10 further includes an instrument current transformer (CT) 51, an instrument voltage transformer (VT) 52, an instrument current transformer (CT) 53, an instrument voltage transformer (VT) 54 and an instrument current transformer (CT).

The power conversion device 10 further includes an MPPT controller 18, a first subtractor 19, a direct-current voltage controller 20, a first adder 21, a first coordinate conversion section 22, a second subtractor 23, a current controller 24 and a PWM drive circuit 25.

The power conversion device 10 further includes a phase-locked loop circuit (PLL circuit) 30 and a power control instruction value calculation section 31.

The direct current-side relay 12 is connected to the direct-current power supply device 8. Direct-current input power from the direct-current power supply device 8 is supplied to a first end of the direct current-side relay 12.

The direct-current power supply device 8 may be, for example, a power supply that is either a solar panel or a storage battery or may include both of these power supplies. The storage battery may include any of various known secondary batteries or fuel batteries. The direct-current power supply device 8 may be formed by a wind power generator and an AC/DC converter device. The direct-current power supply device 8 may be any of various renewable energy power generation device.

The power conversion circuit 14 is interposed between the direct-current power supply device 8 and the power grid 40 and forms a serial circuit jointly with the direct-current power supply device 8 and the power grid 40. This power grid is also generally called a power system. The power system is a system for supplying power to power receiving facilities of consumers. The power system is a system integrating power generation, transformation, transmission and distribution.

The power conversion circuit 14 performs conversion between direct-current power and alternating-current power. A direct-current end of the power conversion circuit 14 is connected to a second end of the direct current-side relay 12. The power conversion circuit 14 is, for example, a three-phase voltage-type inverter circuit including a plurality of semiconductor switching devices.

A first end of the direct-current capacitor 13 is connected to a wiring (for example, a busbar) between the direct current-side relay 12 and the power conversion circuit 14. A second end of the direct-current capacitor 13 is connected to a reference potential such as a ground. The direct-current capacitor 13 is charged with a direct-current voltage $V_{DC}$ appearing on the direct-current side of the power conversion circuit 14.

The alternating-current reactor 15 is connected in series to an alternating-current end of the power conversion circuit 14. A first end of the alternating current-side relay 17 is connected to the alternating-current reactor 15. A second end of the alternating current-side relay 17 is connected to the power grid 40. A first end of the alternating-current capacitor 16 is connected to a wiring (for example, a busbar) connecting the alternating-current reactor 15 and the alternating current-side relay 17. A second end of the alternating-current capacitor 16 is connected to a reference potential such as a ground.

The instrument current transformer (CT) 51 converts a direct current $i_{DC}$ into an instrument value. The direct current $i_{DC}$ is a current flowing between the direct-current power supply device 8 and the power conversion circuit 14. The instrument voltage transformer (VT) 52 converts the direct-current voltage $V_{DC}$ into an instrument value. The direct-current voltage $V_{DC}$ is a voltage between the direct-current power supply device 8 and the power conversion circuit 14 and is a voltage of the direct-current capacitor 13.

The instrument current transformer (CT) 53 converts a three-phase alternating-current output current $i_{AC}$ into an instrument value. The three-phase alternating-current output current $i_{AC}$ is a current flowing between the power conversion circuit 14 and the alternating-current reactor 15. The instrument voltage transformer (VT) 54 converts a system voltage $V_{Grid}$ into an instrument value. The system voltage $V_{Grid}$ is a three-phase alternating-current voltage between the alternating-current capacitor 16 and the power grid 40. The instrument current transformer (CT) 55 converts a system current $i_{Grid}$ into an instrument value. The system current Grid is a three-phase alternating current between the alternating-current capacitor 16 and the power grid 40.

The direct current $i_{DC}$ and the direct-current voltage Vic are input to the MPPT controller 18. The first subtractor 19 calculates a difference between an instruction value $V^*_{DC}$ output by the MPPT controller 18 and the direct-current voltage $V_{DC}$. The MPPT controller 18 maximally extracts direct-current power from the direct-current power supply device 8 by means of MPPT control.

The direct-current voltage controller 20 performs direct-current voltage control based on a result of the subtraction by the first subtractor 19. The first adder 21 adds up an output value of the direct-current voltage controller 20 and a d-axis current instruction value $i^*_d$. The d-axis current instruction value $i^*_d$ is an instruction value output by a later-described power controller 34.

The first coordinate conversion section 22 performs dq-axes/abc-axes conversion, that is, coordinate conversion from two phases to three phases. The first coordinate conversion section 22 calculates a three-phase alternating-current instruction value $i^*_{AC}$ based on a result of the addition by the first adder 21 and a q-axis current instruction value $i^*_q$. The q-axis current instruction value $i^*_q$ is an instruction value output by the later-described power controller 34.

The second subtractor 23 calculates a difference between the three-phase alternating-current instruction value $i^*_{AC}$ and the three-phase alternating-current output current $i_{AC}$.

The current controller 24 calculates a current instruction value based on an output of the second subtractor 23. The PWM drive circuit 25 generates a pulse width modulation signal (PWM signal) according to the current instruction value of the current controller 24. The PWM drive circuit 25 transmits the PWM signal to the power conversion circuit 14 as a drive signal for the semiconductor switching devices.

The PLL circuit 30 outputs a phase instruction value based on a system alternating-current voltage phase of the power grid 40. The PLL circuit 30 outputs a phase instruction value θ* based on the system voltage $V_{Grid}$, a d-axis system voltage $V_d$ and a q-axis system voltage $V_q$. The d-axis system voltage $V_d$ and the q-axis system voltage $V_q$ are output from a later-described second coordinate conversion section 32. A specific circuit of the PLL circuit 30 will be described later with reference to FIG. 2.

The power control instruction value calculation section 31 calculates a power control instruction value based on the phase instruction value θ* from the PLL circuit 30. The power control instruction value is used for control of the power conversion circuit 14. In the embodiment, more specifically, the power control instruction value includes the d-axis current instruction value $i^*_d$ and the q-axis current instruction value $i^*_q$. The power control instruction value calculation section 31 calculates the d-axis current instruction value $i^*_d$ and the q-axis current instruction value $i^*_q$ based on the phase instruction value θ* from the PLL circuit 30, the system voltage $V_{Grid}$, the system current $i_{Grid}$ and the three-phase alternating-current output current $i_{AC}$.

The power control instruction value calculation section 31 may have a DC/AC conversion mode and an AC/DC conversion mode. In the DC/AC conversion, the power control instruction value calculation section 31 calculates the power control instruction value in such a manner that the power conversion circuit 14 converts direct-current power into alternating-current power. In the AC/DC conversion mode, the power control instruction value calculation section 31 calculates the power control instruction value in such a manner that the power conversion circuit 14 converts alternating-current power into direct-current power.

The power control instruction value calculation section 31 includes the second coordinate conversion section 32, a third coordinate conversion section 33 and the power controller 34.

The second coordinate conversion section 32 performs abc-axis/dq-axis conversion, that is, conversion from three phases to two phases. Consequently, the second coordinate conversion section 32 calculates the d-axis system voltage $V_d$ and the q-axis system voltage $V_q$ from the system voltage $V_{Grid}$.

The third coordinate conversion section 33 performs abc-axis/dq-axis conversion, that is, conversion from three phases to two phases. Consequently, the third coordinate conversion section 33 calculates a d-axis system current $i_d$ and a q-axis system current $i_q$ from the system current $i_{Grid}$.

The power controller 34 calculates the d-axis current instruction value $i^*_d$ and the q-axis current instruction value $i^*_q$ based on the above calculated values ($V_d$, $V_q$) from the second coordinate conversion section 32 and the above calculated values ($i_d$, $i_q$) from the third coordinate conversion section 33.

In the below description, for convenience sake, suffix "k" for indicating a time series of control steps is provided to a phase difference θ. It is assumed that a phase difference calculated by the PLL circuit 30 in current control step k is a current phase difference $θ_k$. In this case, a phase difference calculated in previous step k−1, which is a step one step before, is represented by a previous phase difference $θ_{k-1}$. Also, a phase difference calculated in next control step k+1 is represented by a next phase difference $θ_{k+1}$.

Figure 2:
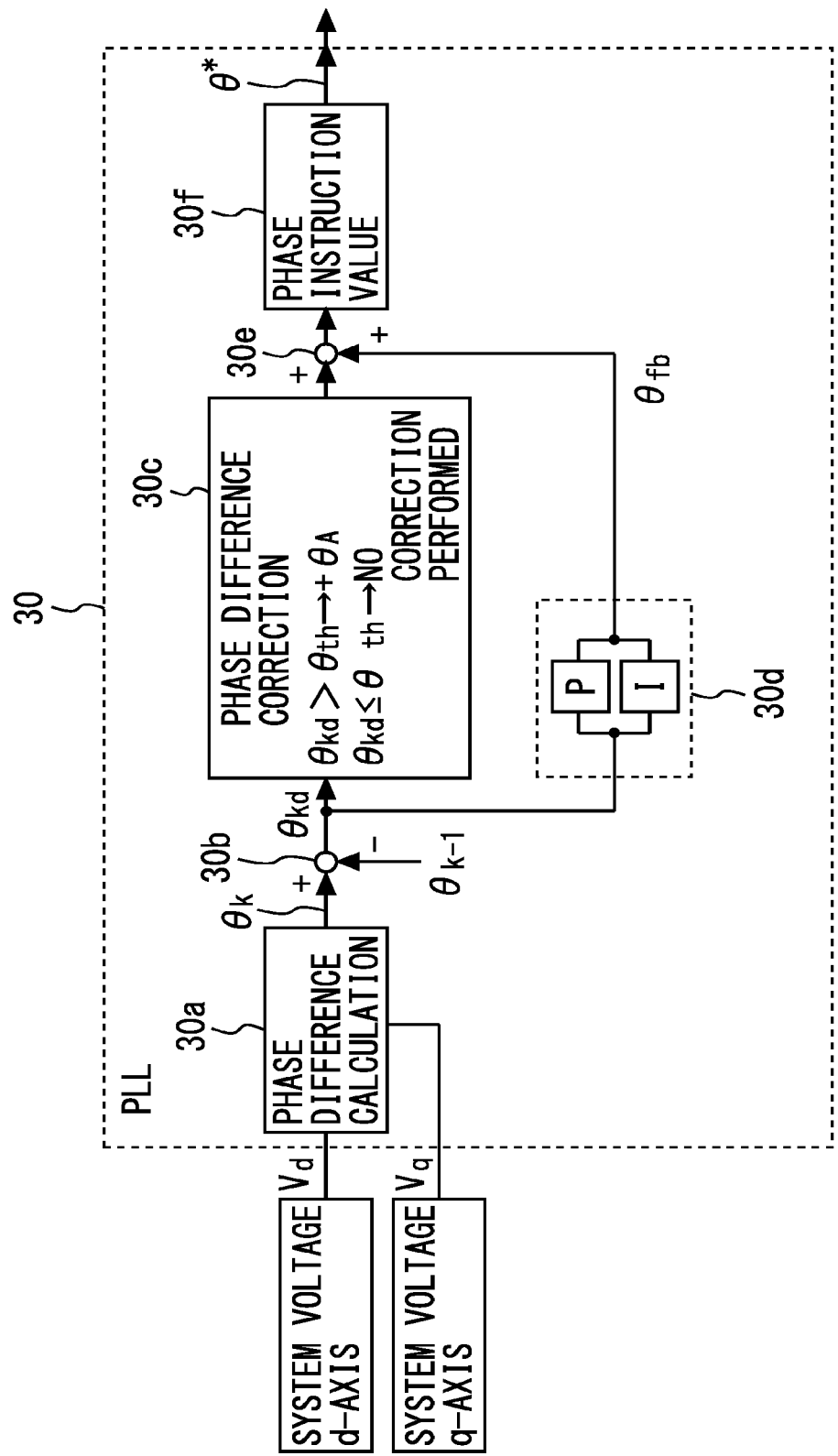
FIG. 2 is a diagram illustrating a configuration of a PLL circuit according to the embodiment.

FIG. 2 is a diagram illustrating a configuration of the PLL circuit 30 according to the embodiment. As illustrated in FIG. 2, the PLL circuit 30 includes a phase difference calculation section 30a, a phase difference subtractor 30b, a phase difference correction section 30c, a feedback correction section 30d, a second adder 30e and a phase instruction value generation section 30f.

The phase difference calculation section 30a calculates the phase difference $θ_k$ in a predetermined control cycle (k−1, k, k+1, . . . ). The phase difference $θ_k$ represents a deviation of the phase instruction value θ* from a system alternating-current voltage phase $θ_{VGrid}$ of the power grid 40. The phase difference calculation section 30a calculates the current phase difference $θ_k$ based on the d-axis system voltage $V_d$ and the q-axis system voltage $V_q$. The current phase difference $θ_k$ represents a degree of deviation of a system voltage phase from a preset reference phase.

The phase difference subtractor 30b calculates a difference between the current phase difference $θ_k$ and the previous phase difference $θ_{k-1}$ stored in advance. In the embodiment, a difference value obtained by subtracting a value of one phase difference from a value of another phase difference is represented by $θ_{kd}$ and is also simply referred to as "difference magnitude $θ_{kd}$".

The phase difference correction section 30c is configured to perform correction of the difference magnitude $θ_{kd}$ according to the value of the difference magnitude $θ_{kd}$. More specifically, if the difference magnitude $θ_{kd}$ exceeds a predetermined reference value $θ_{th}$, the phase difference correction section 30c adds a predetermined first correction amount $θ_A$ to the current phase difference $θ_k$. Consequently, the corrected phase difference ($θ_k + θ_A$) is output.

On the other hand, if the difference magnitude θka does not exceed the reference value $θ_{th}$, the phase difference correction section 30c does not add the first correction amount $θ_A$ to the current phase difference $θ_k$. As a result, the uncorrected phase difference $θ_k$ is output.

The feedback correction section 30d calculates a second correction amount $θ_{fb}$ based on the difference magnitude $θ_{kd}$. The second correction amount $θ_{fb}$ is a feedback correction amount. As an example, the feedback correction section 30d is configured to include a proportional control (P control) block and an integral control (I control) block.

The second adder 30e adds up an output value of the phase difference correction section 30c and an output value of the feedback correction section 30d. The phase instruction value generation section 30f outputs the phase instruction value based on an output of the feedback correction section 30d. More specifically, the phase instruction value generation section 30f generates the phase instruction value θ* based on an output value of the second adder 30e.

Accordingly, the phase instruction value generation section 30f is configured to output the phase instruction value θ* based on the current phase difference $θ_k$, the first correction amount $θ_A$ and the second correction amount $θ_{fb}$. Since correction using both the first correction amount $θ_A$ and the second correction amount $θ_{fb}$ is performed, both the following capability and control stability can be ensured.

As described above, the power conversion device 10 according to the embodiment enables adding the first correction amount $θ_A$ to the current phase difference $θ_k$ only if the difference magnitude $θ_{kd}$ is increased and exceeds the reference value $θ_{th}$.

On the other hand, if the difference magnitude $θ_{kd}$ remains not exceeding the reference value $θ_{th}$, the first correction amount $θ_A$ is not added. Therefore, the first correction amount $θ_A$ can freely be set to a proper value from the perspective of use only when there is an abrupt change of the system voltage phase.

Consequently, the capability of following the system voltage phase $θ_{VGrid}$ can be enhanced. As a result, an unintended increase of the direct-current voltage of the direct-current capacitor at the time of a system disturbance can be suppressed.

Effects of the embodiment will more specifically be described below. According to the embodiment, a function that suppresses a direct-current voltage increase at the time of a system disturbance is provided in a system-connected inverter. When an inverter is connected, the phase on the power grid 40 side may abruptly change. In this case, there arise problems such as overvoltage occurring as a result of control failing to follow the abrupt change and the direct-current capacitor 13 being charged with a voltage from the system side.

A typical PLL function is intended to measure a phase of a system voltage $V_{Grid}$ and calculate a phase instruction value θ of an inverter so as to follow the phase. In the conventional techniques, upon occurrence of a system disturbance, the PLL circuit often fails to follow an abrupt phase change of a system voltage. If an inverter phase instruction deviates from the system voltage phase, no correct calculation for dq conversion is performed. As a result, no correct power control instruction value is calculated. In such case, depending on the phase instruction value θ*, a malfunction, such as the direct-current capacitor being charged from the power grid 40 side even in a case where the direct-current capacitor 13 should be discharged, may occur.

Regarding this point, as illustrated in FIG. 2, the PLL circuit 30 according to the embodiment includes the phase difference correction section 30c at a stage following the phase difference calculation section 30a. The phase difference correction section 30C compares the previous phase difference $\theta_{k-1}$ and the current phase difference $\theta_k$ in terms of phase relationship. If the phase largely deviates, the first correction amount $\theta_A$ is added to the current phase difference $\theta_k$. Consequently, it is possible to forcibly add an offset if the phase largely deviates. As a result, the following capability at the time of a system disturbance can be improved. As a result, the aforementioned direct-current voltage increase can be suppressed.

REFERENCE SIGNS LIST 8 direct-current power supply device
10 power conversion device
12 direct current-side relay
13 direct-current capacitor
14 power conversion circuit
15 alternating-current reactor
16 alternating-current capacitor
17 alternating current-side relay
18 MPPT controller
19 first subtractor
20 direct-current voltage controller
21 first adder
22 first coordinate conversion section
23 second subtractor
24 current controller
25 PWM drive circuit
30 PLL circuit (phase-locked loop circuit)
30a phase difference calculation section
30b phase difference subtractor
30c phase difference correction section
30d feedback correction section
30e second adder
30f phase instruction value generation section
31 power control instruction value calculation section
32 second coordinate conversion section
33 third coordinate conversion section
34 power controller
40 power grid
$i_{AC}$ three-phase alternating-current output current
$V_{DC}$ direct-current voltage
$V_{Grid}$ system voltage
$\theta^*$ phase instruction value
$\theta_A$ first correction amount
$\theta_{th}$ second correction amount
$\theta_{k-1}$ previous phase difference
$\theta_k$ current phase difference
$\theta_{kd}$ difference magnitude
$\theta_{th}$ reference phase (reference value)
$\theta_{VGrid}$ system alternating-current voltage phase
$\theta_{VGrid}$ system voltage phase

The invention claimed is:

1. A power conversion device comprising:
a power conversion circuit connected to a direct-current power supply and a power system and configured to perform conversion between direct-current power and alternating-current power;
a phase-locked loop circuit configured to output a phase instruction value based on a system alternating-current voltage phase of the power system; and
a control circuit configured to control the power conversion circuit based on the phase instruction value from the phase-locked loop circuit,
the phase-locked loop circuit including:
a phase difference calculation section configured to calculate a phase difference in a predetermined cycle, the phase difference representing a deviation of the phase instruction value from the system alternating-current voltage phase of the power system;
a phase difference correction section configured to, if a difference between a current phase difference currently calculated by the phase difference calculation section and a previous phase difference previously calculated by the phase difference calculation section exceeds a predetermined reference, add a first correction amount to the current phase difference to output the corrected current phase difference, and if the difference does not exceed the reference, output the uncorrected current phase difference without adding the first correction amount to the current phase difference; and
a phase instruction value generation section configured to output the phase instruction value based on the output of the phase difference correction section.

2. The power conversion device according to claim 1, wherein:
the phase-locked loop circuit includes a feedback correction section configured to calculate a second correction amount that is a feedback control correction amount based on a magnitude of the difference; and
the phase instruction value generation section is configured to output the phase instruction value based on the current phase difference, the first correction amount and the second correction amount.

* * * * *